US012516222B2

United States Patent
Wigger et al.

(10) Patent No.: US 12,516,222 B2
(45) Date of Patent: Jan. 6, 2026

(54) SELF-ADHESIVE FILM HAVING AN ADHESIVE-FRIENDLY SURFACE AND COVER LAYER

(71) Applicant: UZIN UTZ SCHWEIZ AG, Buochs (CH)

(72) Inventors: Thomas Wigger, Geuensee (CH); Florian Sevenig, Buochs (CH)

(73) Assignee: UZIN UTZ SCHWEIZ AG, Buochs (CH)

( * ) Notice: Subject to any disclaimer, the term of this patent is extended or adjusted under 35 U.S.C. 154(b) by 111 days.

(21) Appl. No.: 17/048,899

(22) PCT Filed: Apr. 18, 2019

(86) PCT No.: PCT/EP2019/060130
§ 371 (c)(1),
(2) Date: Oct. 19, 2020

(87) PCT Pub. No.: WO2019/202094
PCT Pub. Date: Oct. 24, 2019

(65) Prior Publication Data
US 2021/0071038 A1 Mar. 11, 2021

(30) Foreign Application Priority Data
Apr. 20, 2018 (EP) .................................... 18168578

(51) Int. Cl.
*C09J 7/21* (2018.01)
*C09J 7/29* (2018.01)
*C09J 7/38* (2018.01)
*C09J 7/40* (2018.01)

(52) U.S. Cl.
CPC . *C09J 7/21* (2018.01); *C09J 7/29* (2018.01); *C09J 7/38* (2018.01); *C09J 7/40* (2018.01); *C09J 2203/346* (2020.08); *C09J 2301/122* (2020.08); *C09J 2301/302* (2020.08); *Y10T 428/2848* (2015.01)

(58) Field of Classification Search
None
See application file for complete search history.

(56) References Cited

U.S. PATENT DOCUMENTS

| | | | |
|---|---|---|---|
| 3,630,980 A | 12/1971 | Russell | |
| 4,398,985 A | 8/1983 | Eagon | |
| 4,751,122 A * | 6/1988 | May | C09J 7/38 428/192 |
| 4,973,517 A | 11/1990 | Lammers et al. | |
| 5,332,616 A | 7/1994 | Patrick et al. | |
| 6,329,465 B1 | 12/2001 | Takahashi et al. | |
| 7,238,732 B2 | 7/2007 | Bamborough | |
| 8,277,915 B2 * | 10/2012 | Couturier | E04B 1/625 428/40.1 |
| 10,704,254 B2 | 7/2020 | Seabaugh et al. | |
| 2003/0186048 A1 | 10/2003 | Sieber et al. | |
| 2004/0126279 A1 | 7/2004 | Renzi et al. | |
| 2004/0180195 A1 * | 9/2004 | Macuga | C09J 7/241 428/343 |
| 2006/0247369 A1 | 11/2006 | Griswold | |
| 2007/0248817 A1 | 10/2007 | Sieber | |
| 2007/0275196 A1 | 11/2007 | Opuszko | |
| 2008/0145610 A1 | 6/2008 | Muller et al. | |
| 2010/0255162 A1 | 10/2010 | Becraft et al. | |
| 2011/0011515 A1 | 1/2011 | Blasdel | |
| 2013/0052386 A1 | 2/2013 | Slongo | |
| 2013/0086868 A1 | 4/2013 | Vandehey | |
| 2013/0086869 A1 | 4/2013 | Couturier | |
| 2016/0160101 A1 | 6/2016 | Dickens | |
| 2017/0058510 A1 * | 3/2017 | Seabaugh | E04B 1/625 |
| 2019/0270915 A1 | 9/2019 | Wigger | |
| 2020/0056071 A1 | 2/2020 | Wigger | |

FOREIGN PATENT DOCUMENTS

| | | |
|---|---|---|
| CN | 203792801 | 8/2014 |
| CN | 203792801 U | 8/2014 |
| DE | 69327611 T2 | 7/2000 |
| DE | 20 2004 018 380 U1 | 1/2005 |
| EP | 0 567 110 A1 | 10/1993 |
| EP | 0 569 921 B1 | 1/2000 |
| EP | 1506984 A1 | 2/2005 |
| EP | 1 632 341 A1 | 3/2006 |

(Continued)

OTHER PUBLICATIONS

English Translation of International Search Report for PCT/EP2019/060130 dated Aug. 16, 2019.
European Search Report for EP-18168578 dated Oct. 17, 2018.
English Translation of DE69327611, dated Jul. 13, 2000.
Notification of Reasons for Refusal in corresponding JP Patent Application No. 2020-552306 dated Jun. 9, 2022 (pp. 1-20).
John Johnston : Pressure Sensitive Adhesive Tapes, Pressure Sensitive Tape Council, 2000, Chapter 2, pp. 23-34.
John Johnston : Pressure Sensitive Adhesive Tapes, Pressure Sensitive Tape Council, 2000, Chapter 8, pp. 137-175.
Eukalin, Data Sheet, 4 pages (Feb. 15, 2016).
European Partial Search Report corresponding to European Patent Application No. 16 195 064.7 dated Jul. 14, 2017.

(Continued)

*Primary Examiner* — Anish P Desai
(74) *Attorney, Agent, or Firm* — Jenkins, Taylor & Hunt, P.A.

(57) ABSTRACT

The present invention relates to the construction of an adhesive film which is self-adhesive on one side and has an adhesion-friendly surface, to a method for producing a single-sided self-adhesive film of this kind, to a method for applying the single-sided self-adhesive film, more particularly for full-area application to a substrate, e.g., a floor, a wall or a ceiling, and also to the use of the self-adhesive film for application, more particularly full-area application, to a substrate, and for applying an adhesive and/or a leveling compound on the adhesion-friendly surface of the self-adhesive film.

11 Claims, No Drawings

(56) References Cited

FOREIGN PATENT DOCUMENTS

| EP | 2347684 A1 | 7/2011 | |
|---|---|---|---|
| EP | 2 754 705 A1 | 7/2014 | |
| EP | 3 312 249 | 4/2018 | |
| EP | 3 312 250 A1 | 4/2018 | |
| JP | S56127446 A | 10/1981 | |
| JP | 2075678 A2 | 3/1990 | |
| JP | 2002-255670 A | 9/2002 | |
| JP | 2003193005 A | 7/2003 | |
| JP | 2003286455 A | 10/2003 | |
| JP | 2005075886 A | 3/2005 | |
| JP | 2009091476 A | 4/2009 | |
| JP | 2012072347 A | 4/2012 | |
| JP | 6279737 B2 | 2/2018 | |
| WO | WO 1998/02089 A1 | 1/1998 | |
| WO | 2015126931 A1 | 8/2015 | |
| WO | WO 2016/038106 A1 | 3/2016 | |
| WO | WO 2018/073410 A1 | 4/2018 | |
| WO | WO-2018073406 A1 * | 4/2018 | ............... C09J 5/00 |
| WO | 2019020187 A1 | 1/2019 | |

OTHER PUBLICATIONS

European Search Report corresponding to European Patent Application No. 16 195 064.7 dated Jan. 26, 2021.
European Search Report corresponding to European Patent Application No. 16 195 064.7 dated Sep. 14, 2021.
European Search Report for Application No. 16 195 064.7 dated Jul. 24, 2017.
Intercol bv Technical datasheet HM 2007, Version 2011-1, 1 page (undated).
International Preliminary Report on Patentability corresponding to International application No. PCT/EP2017/076840 dated Apr. 23, 2019.
International Search Report corresponding to International application No. PCT/EP2017/076840 dated Dec. 5, 2017.
Klander, 2017, "AMC (Polyacrylat, Polyacrylat-Kautschuk, hytemp)" 2 Pages.
Lunamelt™ PS 7900 ZP, 4 pages (Nov. 5, 2016).
Office Action corresponding to European Patent application No. 16195064.7 dated Apr. 17, 2023.
Office Action corresponding to European Patent Application No. 16195068.8 dated Jan. 25, 2021.
Office Action corresponding to European Patent Application No. 16195068.8 dated Sep. 14, 2021.
Office Action corresponding to European Patent Application No. 16195064.7 dated Sep. 14, 2021.
Search Report corresponding to European Patent Application No. 16195068.8 dated Sep. 14, 2021.
Office Action corresponding to U.S. Appl. No. 16/343,649 dated Mar. 2, 2021.
Office Action corresponding to U.S. Appl. No. 16/343,649 dated Nov. 23, 2021.
Office Action corresponding to U.S. Appl. No. 16/343,649 dated May 25, 2022.
Written Opinion of the International Searching Authority corresponding to International application No. PCT/EP2017/076840 dated Dec. 5, 2017.
Acronal* A 280 (Jun. 12, 2007).
Acronal® A 240 (Sep. 2008).
Airflex® EAF60 Dispersion (Apr. 30, 2007).
Alberdingk® AC 7522 VP Kunststoff-Dispersion (Jul. 6, 2004).
Aquatack X1403 Provisional Product Data Sheet (Mar. 18, 2009).
ASTM International. Designation: E1745-11. Standard Specification for Plastic Water Vapor Retarders Used in Contact with Soil or Granular Fill under Concrete Slabs. Oct. 2011.
ASTM International. Designation: E96/E96M-16. Standard Test Methods for Water Vapor Transmission of Materials. Apr. 2016.
ASTM International. Designation: F710-11. Standard Practice for Preparing Concrete Floors to Receive Relilieint Flooring. Jun. 2011.
DE 202004018380U1 Machine Translation of Claims (EPO/Google) (Year: 2021).
DE 202004018380U1 Machine Translation of Description (EPO/Google) (Year: 2021) (Hajkan).
European Search Report for EP 3 312 249 dated Jul. 24, 2017.
International Preliminary Report on Patentability corresponding to International Application No. PCT/EP2019/060130 dated Oct. 20, 2020, 12 pages.
International Search Report and Written Opinion for International Application No. PCT/EP2017/076830, International Search Authority, United States, mailed on Dec. 6, 2017, 28 pages.
Khan, I., et al., "Natural Rubber-Based Pressure-Sensitive Adhesives: A Review," J Polym Environ (Springer), vol. 19, 2011, pp. 793-811.
Kuraray. Kurarity™ Acrylic Block Copolymer Technical Information. Oct. 2019, 28 Pages.
Novamelt® PS 2050 (2008).
Office Action (Annex to the Communication) corresponding to European Patent Application No. 16195064.7 dated Jul. 25, 2024, 9 pages.
Office Action (Annex to the Communication) corresponding to European Patent Application No. 16195064.7 dated Jan. 26, 2021, 5 pages.
Office Action (Annex to the Communication) corresponding to European Patent Application No. 16195064.7 dated Apr. 18, 2017, 5 pages.
Office Action (Annex to the Communication) corresponding to European Patent Application No. 16195064.7 dated Jan. 10, 2025, 6 pages.
Office Action (Non-Final Rejection) corresponding to U.S. Appl. No. 16/343,627 dated Nov. 10, 2022.
Office Action (Non-Final Rejection) corresponding to U.S. Appl. No. 16/343,627 dated Jul. 20, 2023.
Office Action corresponding to Canadian Patent Application Serial No. 3,097,450 dated Jun. 14, 2024.
Office Action corresponding to European Patent Application No. 18168578.5-1102 dated Jun. 20, 2025, 8 pages. Aug. 25, 2025).
Office Action corresponding to U.S. Appl. No. 16/343,649 dated Sep. 1, 2023.
Office Action corresponding to U.S. Appl. No. 16/343,649 dated Feb. 22, 2023.
Office Action corresponding to U.S. Appl. No. 16/343,649 dated May 9, 2024.
Office Action corresponding to U.S. Appl. No. 16/343,649 dated Sep. 29, 2024.
SBU Functional Polymers, Industrial Segment "Adhesives", Pressure Sensitive Adhesives (Sep. 2013).
Vinnapas® AF 474 (Mar. 4, 2011).

* cited by examiner

SELF-ADHESIVE FILM HAVING AN ADHESIVE-FRIENDLY SURFACE AND COVER LAYER

The present invention relates to the construction of an adhesive film which is self-adhesive on one side and has an adhesion-friendly surface, to a method for producing a single-sided self-adhesive film of this kind, to a method for applying the single-sided self-adhesive film, more particularly for full-area application to a substrate, e.g., a floor, a wall or a ceiling, and also to the use of the self-adhesive film for application, more particularly full-area application, to a substrate, and for applying an adhesive and/or a leveling compound on the adhesion-friendly surface of the self-adhesive film.

PRIOR ART

Single-sided self-adhesive dry adhesives respectively adhesive tapes, which for building site applications are normally made available in rolls, are prevented from interlocking—which means sticking of the layers to each other—by application of an adhesion-reducing layer on the reverse of the adhesive tape or carrier or of a removable liner layer on the layer of pressure sensitive adhesive. This allows the adhesive tapes to be wound without interlocking and unwound again without problems.

The construction with the adhesion-reducing layer on the carrier reverse is inimical to adhesion for further bonding; consequently there is hardly any possibility, in a building site situation, of applying a further layer to these adhesive tapes using conventional adhesives or leveling compounds with sufficient bond strengths—for example, when a vapor retarder is adhered over the full area to a component, e.g., a floor, a ceiling, or a wall, and the intention is to adhere thereon an insulation material, a floor covering, or a protective layer, or to apply thereon a leveling compound, for example.

WO2015/126931 describes rolls which comprise an air and water barrier article having opposing first and second major surfaces, a pressure sensitive adhesive disposed on at least the first major surface of the article, and a liner having a first major surface that contacts the opposing second major surface of the barrier layer, wherein the pressure sensitive adhesive contacts a second major surface of the liner when it is wound. Also described are self-adhering air and water barrier articles and building envelopes produced from the rolls disclosed.

DE 693 27 611 relates to covering substrates, films of plastic, adhesives, release substances, and temporary carriers, and the combination thereof, for producing shaped articles that are suitable for covering surfaces.

When an adhesion-friendly surface is present and an adhesion-reducing layer is absent, the rolls of adhesive tape tend to interlock. This is especially true of self-adhesive films having relatively high peel adhesions according to DIN EN 1939:2003 of above around 15 N/25 mm.

The single-sided self-adhering adhesive tapes to which further bonding is to take place that are nowadays used, therefore, are tapes which on the reverse of the carrier have been given an adhesion-friendly treatment and which, in order to prevent to interlock, have a detachable liner layer on the layer of pressure sensitive adhesive.

These adhesive tapes are not convenient in use, since, before the adhesive tape is adhered, the liner layer must be removed—on the one hand, this makes operation complicated, demanding, and awkward, and, on the other hand, as a result of the removal of the liner layer, the free adhesive tape acquires much greater mobility, and creases can very quickly form. Especially if the self adhesive film has to be applied over the whole area of a surface—a floor, a wall, or a ceiling, for example—and the adhesive films used are therefore relatively wide, at more than 300 mm in width, for example, manual working is in practice no longer possible—you would have to hold the self-adhesive film with one hand, and peel off the protective film with the other, and this would inevitably produce creases. This is a major disadvantage specifically in the full-area bonding of a vapor retarder to a substrate, since it allows gaps to form in the sealing. Moreover, the adhesive tape has to be rubbed on the side of the carrier where further bonding is subsequently to take place. As a result, the reverse of the adhesive film, i.e., the adhesion-friendly surface of the adhesive film, may be damaged, soiled, degraded, or otherwise impaired, and the adhesion-friendliness and/or physical integrity may consequently be impaired, reduced, or even destroyed. Rolls of these kinds, furthermore, have little stability, and tend to unwind themselves or to fall apart. This adds to the inconvenience and complication of operation.

Even if the peel adhesion values of the layer of pressure sensitive adhesive are not very high, a single-sided self-adhering adhesive film with an adhesion-friendly surface but without a removable liner layer may suffer interlocking or may at least exhibit high to very high unwind forces. With wider rolls of more than 300 mm in width, as are required for full-area adherence to a substrate, practical working is no longer possible if the unwind forces are even only increased, for the reasons that, on the one hand, the unwind forces rise in proportion with the width and, on the other hand, during manual unwinding of the self-adhesive film, the point loads onto the adhesive film and/or its carrier rise accordingly. Damage to the self-adhesive film can hardly be avoided. Another possible consequence in some cases, during the unwinding of an adhesive tape roll of this kind, is that pressure sensitive adhesive of the layer of pressure sensitive adhesive may partly remain on the adhesion-friendly surface, which may be disruptive to further working.

Double-sided self-adhering adhesive tapes have two self-adhesive pressure sensitive adhesive (PSA) layers with opposite orientation, with a first layer being open and being applied to the substrate where bonding is to take place, and with the second PSA layer carrying a removable liner layer. The construction of this liner layer is generally such that it adheres a little more strongly on the second PSA layer than on the first PSA layer, so maintaining an unambiguous orientation of the liner layer on the roll. Further bonding can take place by means of the second PSA layer. However, this is not desirable or sensible in all applications. Corresponding adhesive tapes are known for example from DE 298 24 685, EP 0 567 110, or EP 1 311 643. The PSA layers are generally unsuitable for acting as an adhesion-friendly surface to a conventional adhesive or a leveling compound.

On building sites, also, it is generally not possible to implement a suitable surface pretreatment, such as a corona treatment or plasma treatment, for single-sided self-adhering adhesive tapes which are laid over the full area, to transform the hitherto adhesion-reducing layer into an adhesion-friendly surface. In the building site situation, the cost and complexity of apparatus involved is generally impracticable.

There exists, consequently, a demand for a single-sided self-adhesive film for full-area bonding to a substrate, such as a floor, a wall, or a ceiling, for example for a single-sided self-adhering adhesive tape or adhesive sheets, in a width of at least 300 mm, for example, which has a layer of pressure sensitive adhesive and, on the carrier reverse or adhesive tape reverse, that is on the opposing carrier surface, has an adhesion-friendly surface, and which enables practical, convenient use without mechanical aids. This includes in particular the layer of pressure sensitive adhesive being open on unwinding of the self-adhesive film, and the single-sided self-adhesive film being able to be applied on the surface where bonding is to take place, and rubbed, and any liner layer that may need to be removed being necessarily removed only in a subsequent step, in other words before further bonding. This surface is intended preferably to offer an adhesion-friendly surface for a conventional construction adhesive, such as an adhesive for floor coverings, wood flooring adhesives, tile adhesives, etc., or for a conventional leveling compound, such as a self-leveling compound, for example.

BRIEF SUMMARY OF THE INVENTION

The factors for consideration were as follows: For good, convenient applicability of an adhesive film of the invention, such as an adhesive tape, the PSA layer of the adhesive film, such as of the adhesive tape, is preferably open, i.e., is not covered by a liner or a liner layer. For further workability, moreover, there ought to be an adhesion-friendly surface facing the surrounding environment. Since, however, such adhesive films are typically made available as rolls or stacked sheets, it is therefore necessary for the PSA layer preferably not to adhere substantially on the adhesive-friendly surface. This makes it possible to prevent the rolls or sheets sticking to one another or interlocking or being separable only with high forces or, at best, leaving PSA residues of the PSA layer on the adhesion-friendly surface. It is also possible to avoid any removable liner layer being left on the PSA layer of the adhesive film when they come into contact during winding or stacking, or when they are separated during unstacking or unwinding.

The inventors have discovered how a single-sided self-adhesive film must be constructed in order on the one hand to enable convenient, practical—in particular, creaseless, for example—full-area bonding of the single-sided self-adhesive film on a substrate, and, on the other hand, to provide an adhesion-friendly surface on which, additionally, a conventional adhesive or a conventional leveling compound can be adhered.

The inventors have discovered that in this context there can be a maximum adhesion of the PSA layer on the adhesion-friendly surface or on a removable liner layer, at which not only the carrier film but also the PSA layer are substantially not damaged on separation.

In a first aspect, the present invention relates to an adhesive film self-adhesive on one side, comprising
  at least one carrier film, wherein the carrier film has an adhesion-friendly surface on one side; and
  a layer of pressure sensitive adhesive, which is located on a side of the carrier film that faces the surrounding environment, on the side opposing the adhesion-friendly surface;
  wherein a removable liner layer is applied on the adhesion-friendly surface of the carrier film in such a way that the layer of pressure sensitive adhesive has an adhesion, on a surface of the removable liner layer that opposes the adhesion-friendly surface of the carrier film, of less than or equal to 2.50 N/50 mm, preferably less than or equal to 1.25 N/50 mm, measured according to Finat FTM 10, and/or wherein the layer of pressure sensitive adhesive has an adhesion on the adhesion-friendly surface of less than or equal to 2.50 N/50 mm, preferably less than or equal to 1.25 N/50 mm, measured according to Finat FTM 10.

According to certain embodiments, where the removable liner layer is present, the removable liner layer remains on the adhesion-friendly surface of the carrier film during separation, e.g., unstacking or unwinding.

Also disclosed is a method for producing an adhesive film self-adhesive on one side and comprising
  at least one carrier film, wherein the carrier film has an adhesion-friendly surface on one side; and
  a layer of pressure sensitive adhesive, which is located on a side of the carrier film that faces the surrounding environment, on the side opposing the adhesion-friendly surface;
  wherein a removable liner layer is applied on the adhesion-friendly surface of the carrier film in such a way that the layer of pressure sensitive adhesive has an adhesion, on a surface of the removable liner layer that opposes the adhesion-friendly surface of the carrier film, of less than or equal to 2.50 N/50 mm, preferably less than or equal to 1.25 N/50 mm, measured according to Finat FTM 10,
  wherein the layer of pressure sensitive adhesive is applied to a side of the carrier film that faces the surrounding environment and opposes the adhesion-friendly surface, and the removable liner layer is applied on the adhesion-friendly surface of the carrier film, with the removable liner layer being applied before, during, or after the first layer of pressure sensitive adhesive; and/or
  wherein the layer of pressure sensitive adhesive is applied to the carrier film, on the side of the carrier film that opposes the adhesion-friendly surface, wherein the layer of pressure sensitive adhesive, on the adhesion-friendly surface of the carrier film, has an adhesion of less than or equal to 2.50 N/50 mm, preferably less than or equal to 1.25 N/50 mm, measured according to Finat FTM 10.

With this method it is possible in particular to produce the single-sided self-adhesive film of the invention.

The present invention pertains, moreover, to a method for applying, more particularly over the full area, a single-sided self-adhesive film of the invention on a substrate, e.g., a floor, a stair, or a wall, comprising:
  applying the single-sided self-adhesive film to the substrate,
  rubbing and/or rolling the single-sided self-adhesive film on the substrate,
  optionally removing the removable liner layer of the single-sided self-adhesive film, and
  optionally applying an adhesive, a plastering and/or a leveling compound on the adhesion-friendly surface of the single-sided self-adhering self-adhesive film.

Additionally disclosed is the use of the single-sided self-adhesive film of the invention for applying, more particularly over the full area, an adhesive, preferably different from the pressure sensitive adhesive of the layer of pressure sensitive adhesive, and/or a leveling compound to a substrate.

Other aspects of the present invention are apparent from the dependent claims and from the detailed description.

DETAILED DESCRIPTION OF THE INVENTION

Definitions

Unless otherwise defined, technical and scientific expressions used herein have the same meaning as that commonly understood by a person skilled in the field of art of the invention, who in this case is a person skilled in the art in the field of construction adhesives, more particularly of the development of self-adhesive films for construction applications, especially for the bonding of floor coverings or application of leveling compounds to floors.

Finat FTM 10 can be found for example in the FINAT Technical Handbook, in the 9$^{th}$ edition, 2014.

An adhesion-friendly surface is a surface on which a standard-compliant adhesion is obtained using conventional adhesives typical in construction: for example, with adhesives for floor coverings, peel forces of at least 0.5 N/mm, measured by a method based on DIN EN 1372:2015; with wood flooring adhesives, a bond strength of at least 1.0 N/mm$^2$, measured by a method based on DIN EN 14293:2006; with mineral tile adhesives, a bond strength of at least 0.5 N/mm$^2$, measured by a method based on SN EN 1348:2007; with leveling compounds, a bond strength of at least 1.0 N/mm$^2$, measured by a method based on DIN EN 13892-8:2003; and/or, with pressure sensitive adhesives for construction applications, peel forces of at least 5.0 N/25 mm, measured by a method based on DIN EN 1939:2003 are achieved.

For the purposes of the invention, a film is a sufficiently thin material as a base for application of a pressure sensitive adhesive. It is not confined to a specific material. A carrier film is therefore a carrier in the form of a film, in other words a sufficiently thin material. It may be of single-layer or multilayer construction and, as a multilayer carrier film, may consist of identical and/or different layers. The carrier film, for example, is single-layer. According to other examples, the carrier film has two, three, four or more layers. There is no particular restriction on the thickness of the film, provided that it is still flexible, and the thickness may be adapted appropriately to the application.

A pressure sensitive adhesive (PSA) is a physically adhering adhesive which, following application to a carrier material, such as a carrier film, remains viscoelastic and permanently tacky and can then be applied by pressure to a substrate, where it remains attached. In contrast to chemically or physically curing adhesives, PSAs do not exhibit setting processes, instead developing the adhesion solely through interactions between the surfaces of the materials in contact.

PSA layers, or layers of pressure sensitive adhesive, in adhesive tapes, for example, are tacky on the basis of their chemical-physical properties, with the adhesion being determined via physical effects. In contrast to some reactive adhesives, PSA layers are unable to form chemical bonds to a substrate. Essential to the development of the adhesion are microscopic interface effects, such as the wetting of the substrate surface, which is codetermined via the "softness" of the PSA layer and of the surface structure of the substrate and also via the molecular electrical properties of the surfaces of the bonding partners. Substantially, however, it is important to achieve intimate contact over as great as possible an area between a PSA layer and a substrate.

Many adhesive systems utilize changes in physical state, such as by drying, crosslinking, cooling, etc., in order on the one hand to achieve the desired surface contact and on the other hand to exhibit sufficient adhesion and cohesion for the transmission of force, viz adhesive effect. These changes of physical state are brought about by setting processes which are chemical (e.g., crosslinking, polymerizing, etc.) or physical (e.g., cooling, evaporation of solvents, etc.). These possibilities are denied to PSA layers. These layers must be sufficiently 'soft' for intimate surface contact and at the same time sufficiently 'hard' or cohesive to be able to transmit the adhesive forces. PSAs, then, are viscoelastic materials. These materials are in no way pure substances, being instead always technical mixtures of substances, or materials which are constructed from a multiplicity of substances, examples being polymers which differ in molecular mass, differ in sequence, initiator molecules, emulsifiers, stabilizers, reaction regulators, solubilizers, etc. The parameters which are important for the properties of the resultant materials are in this connection not accessible to the person skilled in the development of chemical-technical products in the construction.

A general postulation is that for pressure-sensitive adhesiveness, the glass transition temperature of the PSA layer must be situated at least 15 K to around 35 K below the working temperature. Furthermore, the adhesion is influenced via various forces of attraction and repulsion, examples being van der Waals forces, dipole forces, etc. A key part is played here by the chemical structure of the surfaces involved, which in practice are never known to a sufficient depth of detail.

In spite of numerous conceptual approaches to adhesion, there is no reliable, calculable model for how to achieve the appropriate adhesion to a particular substrate. It is, however, known that adhesion is not only determined by the properties of a PSA layer or by the properties of a substrate surface, but instead develops only through the interaction between the surfaces in question. This means that the adhesion acquired on diverse substrate surfaces with a PSA layer is different. In general, the person skilled in the development of chemical-technical products is not in possession of the full facts about the structure and the properties of the substrate surfaces, and has no detailed information on the precise chemical composition of the raw materials. It is only through empirical studies that the adhesion properties can be ascertained and an appropriate product developed accordingly. In reality, therefore, the person skilled in the development of chemical-technical products has to formulate appropriate solutions from the raw materials options available, and subject them to targeted testing. In summary, the detailed chemical constituents of the adhesives are not relevant to the technical development of self-adhesive products, since there is a complete absence on the one hand of the relevant information about the surfaces, the adhesives, and other materials involved, and also of an applicable, reliable theory about the adhesive mechanisms.

It is for these reasons that pressure sensitive adhesives and PSA layers produced from them continue to be characterized, typically, via parameters, as is apparent, for example, from "Pressure Sensitive Adhesive Tapes, A guide to their function, design, manufacture, and use", John Johnston, 2013, chapter 2, "How pressure sensitive adhesives work", chapter 8, "Design", and chapter 9, "Testing". The development of such parameters is therefore of the utmost interest to the skilled person in the field, so as to be able to take account of these parameters both in ongoing product development and in specific projects.

It is worth keeping in mind here that an adhesion of adhesives, such as of PSAs or other adhesives, for example, can be appropriately adjusted, by means, for example, of attenuation, which is able to achieve a reduction in the tack of a PSA. Attenuation may be achieved, for example, through an addition of particles and/or of a polymer solution and/or wax, etc., and/or by crosslinking.

The present invention relates in a first aspect to an adhesive film self-adhesive on one side, comprising
  at least one carrier film, wherein the carrier film has an adhesion-friendly surface on one side; and
  a layer of pressure sensitive adhesive, which is located on a side of the carrier film that faces the surrounding environment, on the side opposing the adhesion-friendly surface;
  wherein a removable liner layer is applied on the adhesion-friendly surface of the carrier film in such a way that the layer of pressure sensitive adhesive has an adhesion, on a surface of the removable liner layer that opposes the adhesion-friendly surface of the carrier film, of less than or equal to 2.50 N/50 mm, preferably less than or equal to 1.25 N/50 mm, measured according to Finat FTM 10, and/or wherein the layer of pressure sensitive adhesive has an adhesion on the adhesion-friendly surface of less than or equal to 2.50 N/50 mm, preferably less than or equal to 1.25 N/50 mm, measured according to Finat FTM 10.

According to certain embodiments, the removable liner layer adheres on the adhesion-friendly surface with limited forces, and more particularly has an adhesion of 0.05 to 2.50 N/50 mm, preferably 0.10-1.25 N/50 mm, measured according to Finat FTM 10.

According to certain embodiments, in the event of separation, e.g., unstacking or unwinding, of the single-sided self-adhesive film, the removable liner layer remains on the adhesion-friendly surface of the carrier film, such as when the film is provided as a roll or stack, for example. In particular, therefore, the removable liner layer may also remain on the film carrier during application to a substrate, and this facilitates the application of the single-sided self-adhesive film to the substrate and provides for the possibility, in particular, of simple, manual, crease-free application, thus allowing even relatively wide single-sided self-adhesive films to be applied easily to the substrate.

The invention imposes no particular restriction on the carrier film, provided it has on one side an adhesion-friendly surface. The carrier film here may be configured in the form of a single-layer or multilayer film having two or more layers, or else a composite material. The carrier film may be configured as one or more layers, including, for example, in an assembly with a woven fabric, paper and/or nonwoven. In particular it is not permeable to the PSA of the PSA layer.

There is no particular restriction on the material of the carrier film, provided the PSA layer can be applied. For example, the carrier film may be configured as a metal foil or metal layer and/or polymer film, including, for example, in an assembly with a woven fabric, paper and/or nonwoven. As a polymer, the material may also be foamed. According to certain embodiments, the carrier film comprises or consists of a polymer material. There is no particular restriction on the polymer of the carrier film in this case, and it may comprise or consist, for example, of polymer materials selected from the group consisting of polyethylene (PE), polypropylene (PP), polyamides (PA), polyesters (PES), polyethylene-propylene (PEP), polyethylene terephthalate (PET), polymethyl methacrylate (PMMA), polyolefins (PO), polyvinyl chloride (PVC), polycarbonate (PC), polyurethane (PU), and/or copolymers and/or mixtures thereof, and/or consists thereof. If a foam is used or concomitantly used for the carrier film or for one layer in a multilayer carrier film, then it may comprise, for example, a polymer material from the group of polyethylene (PE), polypropylene (PP), aromatic and/or aliphatic polyamides (PA), aliphatic and/or aromatic polyesters (PES), polyethylene-propylene (PEP), polyethers, polyurethane, polyethylene terephthalate (PET), polylactide, polyolefins, and/or polyvinyl chloride and/or copolymers and/or mixtures thereof. The materials stated illustratively, however, do not limit the carrier film.

To produce the adhesion-friendly surface, the surface of the carrier film may be given, for example, an adhesion-friendly treatment, such as with a corona treatment and/or a plasma treatment and/or a primer coating or adhesion promoter layer, for example, and/or by application of a suitable adhesion-friendly material, such as a suitable paper, woven fabric and/or nonwoven, for example, which are not subject to particular restriction and which may be tailored to the material of the carrier film. Nor is there any particular restriction on the adhesion-friendly carrier surface, which may comprise, for example, a polymer, a natural substance, a metal or alloy, a ceramic, and/or a surface modified by a surface treatment. It may likewise be smooth or structured. Examples of adhesion-friendly surfaces that are generally suitable are surfaces of the carrier film that have been treated with a suitable surface treatment, e.g., a corona treatment and/or a plasma treatment; surfaces of the carrier film to which a primer coating or adhesion promoter layer has been applied; and/or surfaces of the carrier film to which a suitable adhesion-friendly material has been applied, such as a paper, woven fabric and/or nonwoven, for example.

It is therefore also possible to use any combinations of a suitable surface treatment, an application of an adhesion promoter layer and an application of an adhesion-friendly material, such as a paper, woven fabric and/or nonwoven, to produce the adhesion-friendly surface of the carrier film. For example, a surface treatment of the carrier film may take place, and thereon an adhesion promoter layer and/or an adhesion-friendly material, such as a paper, woven fabric and/or nonwoven, may be applied. Also possible, for example, is the application on the surface of the carrier film of an adhesion promoter layer and an adhesion-friendly material, such as a paper, woven fabric and/or nonwoven. Equally possible subsequently is for these layers to be provided, for example, with a surface treatment.

It is of course also possible for only one suitable surface treatment to take place in order to produce the adhesion-friendly surface of the carrier film—for example, a corona treatment and/or a plasma treatment, an application of an adhesion promoter layer, or an application of an adhesion-friendly material, such as a paper, woven fabric and/or nonwoven.

The surface treatment, the application of an adhesion promoter layer, and the application of an adhesion-friendly material are in each case not subject here to any particular restriction.

Examples of suitable surface treatment include corona treatment and/or plasma treatment, which are not subject to particular restriction and which may be tailored suitably to the material of the carrier film.

If, for example, an adhesion promoter coating is employed, it is likewise unrestricted and may also be tailored, for example, to the material of the carrier film. An adhesion promoter layer may, for example, comprise a polymer material, which is not subject to the particular restriction—for example, polyacrylate, polystyrene, polyvinyl ester, polyvinyl alcohol, polyethylene, polypropylene, polyvinyl chloride, polyvinylidene chloride, polyurethane, and/or copolymers and/or mixtures thereof.

Nor is there any particular restriction on the adhesion-friendly material, which may comprise, for example, paper, a woven fabric and/or a nonwoven. The paper, the woven fabric, and the nonwoven here are not subject to particular restriction. Suitable nonwovens or woven fabrics may comprise, for example, a material selected from a group encompassing glass, metal, carbon, rayon staple, polymers such as polyethylene, propylene, polyamide, polyester, polyacrylonitrile, and/or copolymers and/or mixtures thereof, and/or combinations of these.

This adhesion-friendly material may be applied suitably on the surface of the carrier film, depending, for example, on the material of the surface of the carrier film and/or on the adhesion-friendly material. For example, the adhesion-friendly material may be applied by adhering, partial melting, etc.

In general there is no restriction on the production of the adhesion-friendly surface of the carrier film, provided in particular that customary construction adhesives, for example, are able to adhere well on the adhesion-friendly surface.

On the other side of the carrier film, this being the side opposite to the adhesion-friendly surface, its nature in particular is such that the PSA layer which is applied thereon adheres well to it.

The PSA layer is likewise not subject to particular restrictions. More particularly, the material of the PSA layer is not subject to particular restriction, and may also comprise mixtures of materials. The PSA layer may be implemented, for example, in the form of a hotmelt adhesive, solvent-based adhesive, or dispersion adhesive. Illustratively, the PSA layer may consist of or comprise a PSA material which is selected from the group consisting of pressure sensitive adhesives based on rubber, natural rubber, synthetic rubber such as, for example, styrene-butadiene block copolymers (SBS), chloroprene rubber, polyurethane, styrene-acrylate, vinyl acetate, vinyl acetate-ethylene, vinyl versatate, polyethylene-vinyl acetate, polyethylene-vinyl versatate, polyacrylate, and/or copolymers thereof, and/or mixtures of these. These, however, do not limit the PSA layer.

An illustrative single-sided self-adhesive film with adhesion-friendly surface is, for example, an adhesive tape consisting of a carrier film, with a PSA layer and an opposing carrier film surface which is adhesion-friendly with respect to other adhesives and/or leveling compounds.

In order to prevent interlocking or sticking together, for example, within a roll or a stack of the single-sided self-adhesive film of the invention, or generally between two single-sided self-adhesive films lying against one another, the peel adhesion forces, i.e., the adhesion, between the upper surface of the single-sided self-adhesive film, an adhesive tape for example, and the PSA layer must be less than or equal to a maximum of 2.50 N/50 mm, measured according to Finat FTM 10. This contradicts the intention, for the single-sided self-adhesive film of the invention, that the adhesion-friendly surface of the carrier layer is to be adhesion-friendly with respect to various conventional adhesives and other substances, such as leveling compounds, for construction applications. The invention is able to resolve this discrepancy in a variety of ways.

For example, the adhesion-friendly surface of the single-sided self-adhesive film may be such that the PSA layer has an adhesion on the adhesion-friendly surface of less than or equal to 2.50 N/50 mm, preferably less than or equal to 1.25 N/50 mm, measured according to Finat FTM 10. In the case of weakly adhering PSA layers in particular, this can be realized with an adhesion of less than 15 N/25 mm, preferably less than 10 N/25 mm, measured according to DIN EN 1939:2003. This may be achieved, for example, through structuring of the surface.

For example, a superficial structure on the upper, adhesion-friendly surface of the single-sided self-adhesive sheet, as for example of an adhesive tape, (adhesion-friendly carrier surface) may be structured in such a way that the area of contact with respect to the PSA layer is reduced such that the adhesion of the PSA layer on the adhesion-friendly surface is less than or equal to 2.5 N/50 mm, preferably less than or equal to 1.25 N/50 mm. By structuring the adhesion-friendly carrier side of the single-sided self-adhesive film in such a way that, on winding, the contact area between PSA layer and adhesion-friendly carrier surface is reduced to such an extent, sticking together and interlocking can be prevented and, at the same time, the entire surface can remain adhesion-friendly, for further bonding with an adhesive or coating with a leveling compound. This solution is appropriate in particular for single-sided self-adhesive tapes with moderate adhesive forces of the PSA layer, exhibiting peel forces according to DIN EN 1939:2003, for example, of less than 15 N/25 mm, preferably less than 10 N/25 mm.

The structuring may be realized, for example, by an embossed carrier surface or by the application and firm connection, on the carrier surface, of a textile structure—for example, rayon staple, cotton, etc.,—with the textile structure not being restricted to these. This textile structure may be suitably attached on the carrier film by means for example of a suitable adhesive or by fusion, etc., there being no particular restriction on the attachment.

The embossing and/or the textile structure may further increase the interengagement with a further adhesive. For example, a textile structure or a structuring, e.g. an embossment, is appropriate.

According to certain embodiments, the adhesion-friendly surface of the carrier film for this purpose has a textile structure and/or is structured.

For example, an adhesion of the PSA layer on the adhesion-friendly surface of less than or equal to 2.5 N/50 mm, preferably less than or equal to 1.25 N/50 mm, can be achieved, for example, by reducing the PSA-contacting surface area of the adhesion-friendly surface, through structuring, to—for example—20% (area/area) or less, preferably 10% or less, more preferably 5% or less, of the total base area, or, in the case of the textile structure, reducing the PSA-contacting surface area of the adhesion-friendly surface to—for example ≤ 20%, preferably ≤10%, more preferably ≤5% of the total base area and so reducing the peel adhesion forces between the PSA layer of the single-sided self-adhesive film and of the structured, adhesion-friendly surface or of the textile structure thereof, consequently, to correspondingly around ≤20%, preferably ≤10%, more preferably ≤5% of the peel adhesion forces on a correspondingly smooth surface. By this means it is possible to upwardly extend the 100% adhesive force between PSA layer and the adhesion-friendly carrier surface accordingly, here for example to 25 N/25 mm or 1.0 N/mm, without interlocking of a roll or of a sheet stack. Structuring or a textile structure in accordance with the invention may be achieved, for example, through a textile structure not subject to any other restriction, such as a coarse woven fabric, for example, or by an embossment, which is likewise not subject to particular restriction.

According to certain embodiments, the uppermost, surrounding environment-facing surface of the textile structure and/or of the structuring of the adhesion-friendly surface of the carrier film accounts for not more than 20%, for example, not more than 10%, for example, not more than 5% of the normal surface of the textile structure and/or of the structuring. This may be determined for example, by treating the surface with ink and printing thereon with a fine halftone and then evaluating the halftoning.

In another embodiment, the uppermost peaks of the structuring may be given an adhesion-reducing treatment such that only these peaks have their adhesion reduced, with the rest of the surface remaining adhesion-friendly. This makes it possible to use more strongly adhering PSA layers as well.

In the case of single-sided self-adhesive films with a relatively strongly adhering PSA layer, therefore, the textile structure or the embossing on the uppermost peaks of the structure may additionally be provided with an adhesion-reducing layer, which preferably must not extend comprehensively over the entire area and structure, with a sufficiently large adhesion-friendly surface nevertheless remaining on the facing side of the carrier, for reliable bonding by a subsequent adhesive. According to certain embodiments, the textile structure or the embossing on the uppermost peaks of the structure is additionally provided with an adhesion-reducing layer in such a way that this layer does not extend comprehensively over the entire area and structure. There is no particular restriction here on the adhesion-reducing layer. For example, it may be chemically and/or physically modified and/or coated and/or may comprise adhesion-reducing materials such as polysiloxanes, polytetrafluoroethylene, etc.

According to certain embodiments, accordingly, the textile structure and/or the structuring of the adhesion-friendly surface of the carrier film, on a side facing the surrounding environment, has an adhesion-reducing surface, which preferably makes up only the topmost, surrounding environment-facing surface of the textile structure and/or of the structuring of the carrier film and therefore accounts for a maximum of 20%, preferably a maximum of 10%, more preferably a maximum of 5% of the total surface area of the side facing away from the carrier film.

According to certain embodiments, the textile structure is connected to the carrier film and/or the structuring is produced by embossing of the carrier film.

In preferred embodiments, moreover, on the adhesion-friendly carrier surface, there may alternatively or additionally be a removable liner layer applied, which preferably is able to adhere weakly on the adhesion-friendly carrier surface. In other embodiments, the opposite side of the liner layer may have been given an adhesion-reducing treatment, in order to prevent interlocking of the single-sided self-adhesive film during the winding or stacking, for example, of a roll of adhesive tape or a stack of adhesive sheets, for example. In this embodiment as well, there may be structuring and/or a textile structure applied on the adhesion-friendly carrier surface.

There is no further determination of the removable, preferably weakly adhering, liner layer. It may for example be or comprise a paper, a nonwoven, a woven fabric, a layer, such as a film layer, for example, or a combination thereof.

Accordingly, the single-sided self-adhesive tape can be wound and unwound without interlocking, and can be conveniently applied to the substrate and rubbed on. The adhesion-friendly surface of the single-sided self-adhesive film here is protected by the—for example, weakly adhering—removable liner layer from damage, soiling, and other detrimental effects or impairments. In a later step, the adhesion-friendly surface of the adhesive film can be exposed simply by peeling off the removable liner layer, and is ready in a perfect state for further bonding.

According to certain embodiments, the removable liner layer is present on the adhesion-friendly surface of the carrier film, wherein the removable liner layer, on a side facing the adhesion-friendly surface of the carrier film, has an adhesion layer, which on the adhesion-friendly surface of the carrier film has an adhesion of 0.05 to 2.50 N/50 mm, measured according to Finat FTM 10. In this way it is possible for this layer to remain on the carrier film during unwinding, withdrawal from a stack, etc., without damage to the self-adhesive film or the adhesion-friendly surface, but it can easily be separatively removed for further processing of the adhesion-friendly adhesive film.

There is no particular restriction here on the adhesion layer. For example, the adhesion layer may be a very weakly adhering polymer layer, e.g., a blend of pressure sensitive adhesives and adhesion-reducing additions such as fillers (e.g., particulate solids, inorganic or organic), waxes, polymer particles, etc. The adhesion layer may be configured, for example, as a hotmelt adhesive, solvent-based adhesive, or dispersion adhesive. Illustratively, the adhesion layer may consist of or comprise an adhesion material, which is not subject to particular restriction. The adhesion material in this case may comprise, for example, a pressure sensitive adhesive and an adhesion-reducing component, neither of which is subject to particular restriction. For example, the pressure sensitive adhesive may be selected from the group consisting of pressure sensitive adhesives based on rubber, natural rubber, synthetic rubber such as, for example, styrene-butadiene block copolymers (SBS), chloroprene rubber, polyurethane, styrene-acrylate, vinyl acetate, vinyl acetate-ethylene, vinyl versatate, polyethylene-vinyl acetate, polyethylene-vinyl versatate, polyacrylate, and/or copolymers thereof, and/or mixtures thereof, the pressure-sensitive adhesive not being restricted to these. The adhesion-reducing component may consist of or comprise, for example, a material selected from the group consisting of particles (e.g., in the form of dispersion, powder and/or fibers) based on waxes, starch, polymers, minerals, celluloses and/or mixtures thereof, with the adhesion-reducing component not being restricted to these.

The adhesion materials stated illustratively do not, however, limit the adhesion layer, provided the adhesion achieved with this layer on the adhesion-friendly surface of the carrier film is, in particular, from 0.05 to 2.50 N/50 mm, measured according to Finat FTM 10.

As a result of the presence of the adhesion layer, the bond-friendliness of the adhesion-friendly surface of the carrier film can be effectively retained, and the surface remains undamaged, but the removable liner layer can also be easily removed manually. Correspondingly, especially in the presence of a removable liner layer with adhesion layer, manual working with application to a substrate is easy, because the removable liner layer can first remain on the single-sided self-adhesive film, during unwinding from a roll or removal from a stack, for example, and can therefore also be applied with the single-sided self-adhesive film to the substrate, but subsequently can also be easily separatively removed from the single-sided self-adhesive film. In this procedure, neither the adhesion of the single-sided self-adhesive film on the substrate, by the PSA layer, nor the further processing thereof, by damage to the adhesion-friendly surface, is adversely affected.

According to certain embodiments, the removable liner layer is present on the adhesion-friendly surface of the carrier film, with the removable liner layer having an adhesion-reducing layer on a side that opposes the adhesion-friendly surface and that faces the surrounding environment. This adhesion-reducing layer is then in contact with the PSA layer, for example, in the event of winding of the single-sided self-adhesive film or in the event of stacking one atop another. This does allow, however, the PSA layer to be separatively removed again easily from the removable liner layer during unwinding, lifting from the stack, etc.

The adhesion-reducing layer of the weakly adhering liner layer is not more closely defined. It may, for example, be or comprise a silicone, a wax, a polyfluorinated polymer such as Teflon, POM (polyoxymethylene), etc., but is not restricted to these.

According to certain embodiments, the removable liner layer is present on the adhesion-friendly surface of the carrier film, wherein the removable liner layer, on a side facing the adhesion-friendly surface of the carrier film, has an adhesion layer, wherein the adhesion of the adhesion layer of the removable liner layer on the adhesion-friendly surface of the carrier film is at least approximately twice as high—for example, three times as high—as the adhesion of the layer of pressure sensitive adhesive of the self-adhesive film on the adhesion-reducing layer of the liner layer. In this way it is possible in particular to prevent the removable liner layer from detaching on detachment of the PSA layer, in the event of unwinding or removal from a stack, for example. It has been found more particularly that the adhesive force of the weakly adhering adhesion layer of the removable liner layer on the adhesion-friendly carrier surface ought to be at least around twice as high as the adhesive forces of the PSA layer of the single-sided self-adhesive film—e.g., of an adhesive tape or an adhesive sheet—on the adhesion-reducing layer of the removable liner layer.

It has been found, furthermore, that for practicable use, the adhesion of the weakly adhering adhesion layer on the adhesion-friendly carrier surface is to be situated in the range between 0.05 and 2.50 N/50 mm, measured according to Finat FTM 10, and the adhesion of the PSA layer of the single-sided self-adhesive film—e.g., of a self-adhesive film or of an adhesive sheet—on the substrates where bonding is to take place is to be at least twice as high as the adhesion of the adhesion layer of the detachable liner layer on the adhesion-friendly carrier surface; in particular, the effectively practicable adhesion values of the adhesion layer may be tailored to the minimum adhesive forces of the PSA layer of the self-adhesive film or of the adhesive sheet, respectively, on the substrates where bonding is to take place. These adhesive forces may be measured, for example, by a method based on DIN EN 1939:2003, and are preferably at least twice as high as the adhesion values of the weakly adhering adhesion layer on the adhesion-friendly carrier surface.

It has been found more particularly that the adhesion between the weakly adhering adhesion layer and the adhesion-friendly carrier surface is to exhibit a maximum of 50% of the adhesion of the PSA layer on the substrates where bonding is to take place, in order to ensure effective detachability of the removable liner layer, without overall separative removal again of the single-sided self-adhesive film of the invention.

According to certain embodiments, the adhesion of the adhesion layer of the removable liner layer on the adhesion-friendly surface of the carrier film, measured according to Finat FTM 10, is a maximum of 50% of the adhesion of the layer of pressure sensitive adhesive of the self-adhesive film on a substrate where bonding is to take place, measured, for example, by a method based on DIN EN 1939:2003. In this context, the expression "by a method based on DIN EN 1939:2003", means that the measurement is made as in DIN EN 1939:2003, but with the substrate specified in the standard having been replaced by the substrate under determination.

The measurement of the adhesion takes place in analogy to DIN EN 1939:2003, using the identical testing methods, although project-specific substrates may be used. This means that the entire test takes place exactly in accordance with the mandates of DIN EN 1939:2003, but that the substrate specified therein is replaced by a project-specific substrate. In accordance with the standard, the measurement is made after application according to the normatively specified method. The testing takes place in each case under standard conditions, namely at 23° C. and 50% atmospheric humidity.

Furthermore, however, the measurement is made according to DIN EN 1939:2003. For this purpose, test specimens are adhered to the project-specific substrates by methods described in DIN EN 1939:2003 and are tested according to the methods described in DIN EN 1939:2003.

According to certain embodiments, the adhesion of the—for example weakly adhering—adhesion layer is in the range between 0.05 and 2.50 N/50 mm, measured according to Finat FTM 10, with the adhesion of the adhesion layer on the adhesion-friendly surface of the carrier film being at least around twice as high as the adhesion of the PSA layer of the single-sided self-adhesive film—of an adhesive tape, for example—on the adhesion-reducing layer of the liner layer. The adhesion of the PSA layer on the adhesion-reducing layer of the removable liner layer is situated more particularly in the range of 0.05 and 1.25 N/50 mm, measured according to Finat FTM 10.

In particular, according to certain embodiments, a standard-compliant adhesion is achieved on a adhesion-friendly surface of the invention, using conventional adhesives typical within construction; for example, with adhesives for floor coverings, peel forces of at least 0.5 N/mm, measured by a method based on DIN EN 1372:2015; with wood flooring adhesives, a bond strength of at least 1.0 N/mm$^2$, measured by a method based on DIN EN 14293:2006; with mineral tile adhesives, a bond strength of at least 0.5 N/mm$^2$, measured by a method based on SN EN 1348:2007; with leveling compounds, a bond strength of at least 1.0 N/mm$^2$, measured by a method based on EN 13892-8:2003; and/or, with pressure sensitive adhesives for construction applications, peel forces of at least 5.0 N/25 mm, measured by a method based on DIN EN 1939:2003.

The adhesives typical within construction are, more particularly, dispersion adhesives, 1K PU, 2K PU, 2K epoxy, or MS adhesives, which in construction applications are employed for the particular applications, such as the bonding of a floor covering, for example. There are no particular restrictions on these adhesives.

According to certain embodiments, on the adhesion-friendly surface of the carrier foil, a standard-compliant adhesion is achieved with an adhesive selected from dispersion adhesives, 1K PU, 2K PU, 2K epoxy, or MS adhesives, so producing on the adhesion-friendly surface of the carrier foil, preferably, with adhesives for floor coverings a peel force of at least 0.5 N/mm, measured by a method based on DIN EN 1372:2015; with wood flooring adhesives, a bond strength of at least 1.0 N/mm$^2$, measured by a method based on DIN EN 14293:2006; with mineral tile adhesives, a bond strength of at least 0.5 N/mm$^2$, measured by a method based on SN EN 1348:2007; with leveling compounds, a bond strength of at least 1.0 N/mm$^2$, measured by a method based on EN 13892-8:2003; or, with pressure sensitive adhesives for construction applications, especially for the bonding of floor coverings or stair coverings, a peel force of at least 5.0 N/25 mm, measured by a method based on DIN EN 1939:2003. In this context as well, the expression "by a method based on" in relation to the particular measurement means that the surface specified in the standard is replaced by the surface of the carrier foil, but that the measurement otherwise takes place in accordance with the standard in question. In these measurement methods as well, the expression "by a method based on" means that the measurement is made on the corresponding adhesion-friendly surface rather than the surface according to the standard, but that otherwise the normative conditions are observed.

According to certain embodiments, the single-sided self-adhesive film is configured as a roll, as adhesive tape, for example, or as a sheet, such as an adhesive sheet, for example.

According to certain embodiments, the self-adhesive film of the invention comprises a retarding layer for moisture and/or a blocking layer for plasticizers, neither of which is subject to particular restriction.

A retarding layer for moisture is understood to be a retarder with respect to migrating or diffusing moisture—for example, generally, to diffusion of water, as by osmosis, for example. Similar comments apply in respect of the blocking layer for plasticizers, which is able to prevent plasticizer passage. For this purpose, the layers typically used may be employed, and may be integrated in the carrier film, for example.

There is no particular restriction on the at least one retarding layer for/with respect to moisture, provided it acts as a retarder with respect to moisture, and it may, for example, be polymeric, metallic and/or ceramic—a metal oxide layer, for example.

Examples of suitable metals include Al, Cu, Ag, Au, Ti, Cr, Ni, Pd and/or Pt, which may be provided in the form of a foil and/or may have been coated, by vapor deposition, for example. Examples of suitable metal oxides include aluminum oxide, silicon dioxide, titanium oxide, etc., and mixed oxides. The at least one moisture retarding layer may also be designed as a polymer and may comprise or consist, for example, of a material selected from the group consisting of polypropylene (PP), polyethylene (PE), polyolefins (PO), latex, nitrile rubber (NBR), styrene-butadiene rubber (SBR), polycarbonate (PC), polyvinyl chloride (PVC), polyvinyl acetate (PVAC), polyurethane (PU) and/or copolymers and/or mixtures thereof.

The material of the blocking layer, which is impermeable for plasticizers, is not subject to any particular restriction here, provided it prevents plasticizer passage, and it is, for example, polymeric, metallic and/or ceramic—that is, comprises and/or consists of one or more polymers, metals and/or ceramics. The blocking layer which is impermeable to plasticizers may for example be a layer which comprises and/or consists of a metal, a metal oxide and/or a polymer comprising polyethylene terephthalate (PET), aromatic and/or aliphatic polyamides (PA), aliphatic and/or aromatic polyesters (PES), polymethyl methacrylate (PMMA), polyacrylonitrile (PAN), polyvinyl chloride (PVC), polycarbonate (PC), polyurethane (PU), polyvinyl acetate (PVAC), polyvinyl alcohol (PVOH) and/or copolymers and/or mixtures thereof.

According to certain embodiments, the at least one moisture retarding layer and/or the optional at least one blocking layer which is impermeable to plasticizers is integrated in the carrier film.

According to certain embodiments, the single-sided self-adhesive film has a width of at least 300 mm, preferably at least 350 mm, more preferably at least 400 mm, for example, of at least 500 mm. With the single-sided self-adhesive film of the invention, crease-free manual application is possible even where the single-sided self-adhesive film is relatively wide. This is especially so if there is a removable liner layer present.

Further disclosed is a method for producing a single-sided self-adhesive film comprising
  at least one carrier film, wherein the carrier film has an adhesion-friendly surface on one side; and
  a layer of pressure sensitive adhesive, which is located on a side of the carrier film that faces the surrounding environment, on the side opposing the adhesion-friendly surface;
  wherein a removable liner layer is applied on the adhesion-friendly surface of the carrier film in such a way that the layer of pressure sensitive adhesive has an adhesion, on a surface of the removable liner layer that opposes the adhesion-friendly surface of the carrier film, of less than or equal to 2.50 N/50 mm, preferably less than or equal to 1.25 N/50 mm, measured according to Finat FTM 10,
  wherein the layer of pressure sensitive adhesive is applied to a side of the carrier film that faces the surrounding environment and opposes the adhesion-friendly surface, and the removable liner layer is applied on the adhesion-friendly surface of the carrier film, with the removable liner layer being applied before, during, or after the first layer of pressure sensitive adhesive; and/or
  wherein the layer of pressure sensitive adhesive is applied to the carrier film, on the side of the carrier film that opposes the adhesion-friendly surface, wherein the layer of pressure sensitive adhesive, on the adhesion-friendly surface of the carrier film, has an adhesion of less than or equal to 2.50 N/50 mm, preferably less than or equal to 1.25 N/50 mm, measured according to Finat FTM 10.

With the method of the invention it is possible in particular to produce the single-sided self-adhesive film of the invention. Accordingly, the respective layers may be designed as indicated above for the single-sided self-adhesive film of the invention. There are no particular restrictions on the respective application of the respective layers. Establishing an adhesion-friendly surface on the part of the carrier film may be accomplished as described above.

According to certain embodiments, a removable liner layer is applied on the adhesion-friendly surface of the carrier film, wherein an adhesion layer is applied to the removable liner layer before the application of the removable liner layer to the adhesion-friendly surface of the carrier film, wherein the removable liner layer is applied to the carrier film in such a way that the adhesion layer on the removable liner layer comes into contact with the adhesion-friendly surface of the carrier film, preferably wherein the adhesion layer on the adhesion-friendly surface of the carrier film has an adhesion of 0.05 to 2.50 N/50 mm, preferably 0.10-1.25 N/50 mm, measured according to Finat FTM 10.

The application of the adhesion layer to the removable liner layer is not subject here to any particular restriction. The adhesion layer here may have the nature and constitution as discussed in connection with the single-sided self-adhesive film of the invention.

Also, according to certain embodiments, an adhesion-reducing layer may be applied to the removable liner layer before the removable liner layer is applied to the adhesion-friendly surface, with the removable liner layer being applied to the adhesion-friendly surface of the carrier film in such a way that the adhesion-reducing layer is present on a side of the removable liner layer that opposes the adhesion-friendly surface and that faces the surrounding environment. The application of the adhesion-reducing layer is also not subject to particular restriction.

If both the adhesion layer and the adhesion-reducing layer are applied to the removable liner layer, they are applied on opposite sides of the removable liner layer, and they may be applied successively or simultaneously. Here, preferably, the adhesion-reducing layer is applied first.

According to certain embodiments, the removable liner layer may remain on the adhesion-friendly surface of the carrier film on separation, of the adhesive film rolls or stacks, for example—unstacking or unwinding, for example.

According to certain embodiments, the adhesion-friendly surface of the carrier film is produced by physical and/or chemical pretreatment, coating, embossing of the carrier film and/or joining of a textile structure to the carrier film. The surface of the carrier film may be given a adhesion-friendly treatment for example for producing the adhesion-friendly surface, for example, with a corona treatment and/or a plasma treatment and/or a primer coating or adhesion promoter layer, and/or by application of a suitable adhesion-friendly material, such as a suitable woven fabric or non-woven, for example, which are not subject to particular restriction and which may be tailored to the material of the carrier film and/or of the construction adhesives. According to certain embodiments, the PSA layer has an adhesion on the adhesion-friendly surface of the carrier film of less than or equal to 2.50 N/50 mm, preferably less than or equal to 1.25 N/50 mm, measured according to Finat FTM 10.

The present invention relates, moreover, to a method for applying—in particular over the full area—the single-sided self-adhesive film of the invention on a substrate, e.g., a floor, a stair, or a wall, comprising:

applying the single-sided self-adhesive film to the substrate, rubbing and/or rolling the single-sided self-adhesive film on the substrate, optionally removing the removable liner layer of the single-sided self-adhesive film, and optionally applying an adhesive, a plastering and/or a leveling compound—for example, a self-leveling compound or wall-smoothing compound—on the adhesion-friendly surface of the single-sided self-adhering self-adhesive film. Atop the plastering and/or leveling compound it is then possible, subsequently, to apply a further covering such as a floor, a wall covering, etc. The plastering or the leveling compound is not subject to any particular restriction. Nor is there any particular restriction on the application, the rubbing and/or rolling on the substrate, the optional removal of the removable liner layer, and the optional application of an adhesive, a plastering and/or a leveling compound—for example, a self-leveling compound—on the adhesion-friendly surface of the single-sided self-adhering self-adhesive film. The steps can be performed in accordance with the art.

The substrate, being for example a floor, a stair or a wall, is likewise not subject to particular restriction here in terms of the material and/or the nature/consistency.

According to certain embodiments, the single-sided self-adhesive film is applied with a width of at least 300 mm, preferably at least 350 mm, more preferably at least 400 mm, for example, of at least 500 mm. With the single-sided self-adhesive film of the invention, crease-free manual application is possible even where the single-sided self-adhesive film is relatively wide. This is especially so if a removable liner layer is present. At the upper end, there is no particular restriction on the width of the single-sided self-adhesive film. For example, single-sided self-adhesive films with a width of up to 1.20 m may be provided, and may be suitably applied on a substrate.

According to certain embodiments, a leveling compound and/or an adhesive are/is applied on the adhesion-friendly surface and/or carrier surface of the single-sided self-adhering self-adhesive film, with a floor covering being bonded subsequent to the leveling compound and/or the adhesive. The floor covering here is not subject to particular restriction and embraces, for example, a PVC, CV, carpet, linoleum, wood floor, rubber, cork covering, etc.

Further disclosed is the use of the single-sided self-adhesive film of the invention for applying, especially over the full area, a leveling compound and/or an adhesive, preferably different from the pressure sensitive adhesive of the layer of pressure sensitive adhesive, to a substrate. Accordingly, the single-sided self-adhesive film of the invention serves as a mediator for application to the substrate on which, for example, the adhesive and/or the leveling compound in question do not adhere sufficiently or are not to be applied for other reasons. Functionalization may be accomplished here additionally through further layers such as a moisture retarding layer and/or a plasticizer blocking layer, in order for example to obtain appropriate protection of the adhesive and/or of the leveling compound, of a floor covering, etc.

The embodiments, refinements, and developments above may be combined arbitrarily with one another insofar as is rational. Further possible refinements, developments, and implementations of the invention also embrace combinations not explicitly stated of features of the invention that are described above or below with respect to the working examples. In particular, the skilled person will also add individual aspects, as improvements or additions, to the respective basic form of the present invention.

The invention is represented below with a number of illustrative embodiments which, however, do not subject it to any limitation.

Example 1

An illustrative construction of a single-sided self-adhesive film of the invention is as follows (e.g., viewed from above upon application to a substrate):

adhesion-reducing layer of a removable liner layer: silicone carrier of the detachable liner layer: e.g., paper, film adhesion layer of the detachable liner layer, as indicated illustratively below adhesion-friendly surface of a carrier film, produced, for example, by corona treatment of the carrier film carrier film: for example, polymer film, e.g., PP film or PET film, or multilayer film pressure sensitive adhesive layer with peel adhesion >15 N/25 mm according to DIN EN 1939:2003 adhesion of the PSA layer on the adhesion-reducing layer of the removable liner layer <1 N/50 mm, here more particularly 0.3 N/50 mm according to Finat FTM 10

The material is produced in accordance with the invention in sheets and wound into rolls.

Examples of suitable formulations for the adhesion layer, and the adhesion of the adhesion layer on the adhesion-friendly surface of the carrier film in example 1, are found in table 1 below. Materials used for the adhesion layer were the following materials:

Pr31L-105: ALBERDINGK® AC 75063 50 wt % and ALBERDINGK® U3251 50 wt %;
Pr31L-106: Primal/AXILA™ 4801 50 wt % and ALBERDINGK® U3251 50 wt %;
Pr31L-114: BASF ACRONAL® V212 30 wt % and ALBERDINGK® U3251 70 wt %

The adhesion layer was applied with a layer thickness of around 20 g/m².

TABLE 1 illustrative adhesion layer materials and adhesion on the bond-friendly surface of the carrier film in example 1

| Formulation | Pr31L-106 | Pr31L-114 | Pr31L-105 |
|---|---|---|---|
| Adhesion to Finat FTM 10 [N/50 mm] | 0.23 | 0.20 | 1.00 |

Example 2

Another illustrative construction of a single-sided self-adhesive film of the invention with a textile surface on the carrier film is as follows (e.g., viewed from above upon application to a substrate):

adhesion-reducing layer of a removable liner layer: silicone
carrier of the detachable liner layer: e.g., paper, film
adhesion layer of the detachable liner layer, as indicated illustratively below
adhesion-friendly surface: nonwoven, e.g., PES spunbonded 80 g/m²
laminating adhesive
carrier film: for example, polymer film, e.g., PP film or PET film, or multilayer film
pressure sensitive adhesive layer with peel adhesion >15 N/25 mm according to DIN EN 1939:2003
adhesion of the PSA layer on the adhesion-reducing layer of the removable liner layer <1 N/50 mm, here more particularly 0.3 N/50 mm according to Finat FTM 10

The material is produced in accordance with the invention in sheets and wound into rolls.

Examples of suitable formulations for the adhesion layer, and the adhesion of the adhesion layer on the adhesion-friendly surface of the carrier film with textile structure in example 2, are found in table 2 below. Materials used for the adhesion layer were the following materials Pr31L-121: ALBERDINGK® AC 75013 50 wt % and BASF ACRONAL® V212 50% wt %;
Pr31L-157: BASF LUPHEN® D 259 U 100 wt %;
Pr31L-154: BASF ACRONAL® A 245 100 wt %

The adhesion layer was applied with a layer thickness of around 25 g/m².

TABLE 2 illustrative adhesion layer materials and adhesion on the bond-friendly surface of the carrier film in example 2

| Formulation | Pr31L-121 | Pr31L-157 | Pr31L-154 |
|---|---|---|---|
| Adhesion to Finat FTM 10 [N/50 mm] | 0.50 | 0.25 | 1.08 |

Example 3

Another illustrative construction of a single-sided self-adhesive film of the invention with a textile surface or structured surface on the carrier film is as follows (e.g., viewed from above upon application to a substrate):

adhesion-friendly surface as indicated illustratively below
laminating adhesive
carrier film: for example, polymer film, e.g., PP film or PET film, or multilayer film
pressure sensitive adhesive layer with peel adhesion <10 N/25 mm, here more particularly 6.0 N/25 mm according to DIN EN 1939:2003

The material is produced in accordance with the invention in sheets and wound into rolls.

Examples of suitable adhesion-friendly surfaces on which at the same time a PSA layer with peel adhesion <10 N/25 mm to DIN EN 1939:2003 exhibits sufficiently low adhesion, and also the adhesion values on the carrier film with textile structure or structuring of the adhesion-friendly surface, according to example 3, are found in table 3 below. Materials used for the adhesion-friendly surface were the following materials:

Pr31S-12: rayon staple fabric 120 g/m²
Pr31S-17: Huhtamaki LDPE 60219 D119
Pr31S-24: Huhtamaki LDPE 16000 D124

TABLE 3 illustrative adhesion on the bond-friendly surface of the carrier film in example 3

| Layer examples | Pr31S-12 | Pr31S-17 | Pr31S-24 |
|---|---|---|---|
| Adhesion to Finat FMT 10 [N/50 mm] | 1.64 | 0.55 | 0.10 |

Example 4

Shown below are examples of the adhesion of various adhesives on an adhesion-friendly surface of a single-sided self-adhesive film of the invention.

The adhesion-friendly surface in this case is achieved through corona treatment of a PP film as carrier film. Table 4 below reports the adhesion values achievable on the adhesion-friendly surface using various adhesives and leveling compounds.

TABLE 4 adhesion of different adhesives on a bond-friendly surface of a one-sidedly self-adhesive film of the invention

| Adhesive type | Adhesive | Test standard | Standard specification | Test value |
|---|---|---|---|---|
| Floor covering adhesive dispersion | Uzin KE 2000 | DIN EN 1372: 2015 | 0.5N/mm | 0.77N/mm |
| Carpet adhesive | Uzin UZ 57 | DIN EN 1372: 2015 | 0.5N/mm | 0.56N/mm² |
| Wood flooring adhesive | Uzin MK 92 | DIN EN 14293: 2006 | 1.0N/mm² | 1.25N/mm² |
| Pressure sensitive adhesive | from ex. 2 | DIN EN 1939: 2003 | none | 49N/25 mm |

Example 5

Shown below are examples of the adhesion of various adhesives on an adhesion-friendly surface of a single-sided self-adhesive film of the invention.

The adhesion-friendly surface in this case is achieved through a laminated-on polyester nonwoven on the carrier film. Table 5 below reports the adhesion values achievable on the adhesion-friendly surface using various adhesives and leveling compounds.

TABLE 5 adhesion of different adhesives on a bond-friendly surface of a one-sidedly self-adhesive film of the invention

| Adhesive type | Adhesive | Test standard | Standard specification | Test value |
|---|---|---|---|---|
| Wood flooring adhesive | Uzin MK92 | DIN EN 14293: 2006 | $1.0 N/mm^2$ | $1.25 N/mm^2$ |
| Tile adhesive | Codex CX-3 | SN EN 1348: 2007 | $0.5 N/mm^2$ | $0.95 N/mm^2$ |
| Leveling compound | Uzin NC 172 | DIN EN 13892-8: 2008 | $1.0 N/mm^2$ | $1.7 N/mm^2$ |

The invention claimed is:

1. A single-sided self-adhesive film, comprising:
    at least one carrier film, wherein the carrier film has an adhesion-friendly surface on one side, and further wherein the adhesion-friendly surface is a surface having:
        a peel force of at least 0.5 N/mm measured by a method based on DIN EN 1372:2015 with adhesives for floor coverings;
        a bond strength of at least $1.0 N/mm^2$ measured by a method based on DIN EN 14293:2006 with wood flooring adhesives;
        a bond strength of at least $0.5 N/mm^2$ measured by a method based on SN EN 1348:2007 with mineral tile adhesives;
        a bond strength of at least $1.0 N/mm^2$ measured by a method based on DIN EN 13892-8:2003 with leveling compounds; and/or
        a peel force of at least 5.0 N/25 mm measured by a method based on DIN EN 1939:2003 with pressure sensitive adhesives for construction applications; and
    a layer of pressure sensitive adhesive, which is located on a side of the carrier film that faces the surrounding environment, on the side opposing the adhesion-friendly surface;
    wherein a removable liner layer having an adhesion-reducing layer on a side opposing the adhesion-friendly surface and facing the surrounding environment is applied on the adhesion-friendly surface of the carrier film in such a way that the layer of pressure sensitive adhesive has an adhesion, on a surface of the removable liner layer that opposes the adhesion-friendly surface of the carrier film, of less than or equal to 2.50 N/50 mm measured according to Finat FTM 10; and
    wherein the removable liner layer, on a side facing the adhesion-friendly surface of the carrier film, has an adhesion layer, which on the adhesion-friendly surface of the carrier film has an adhesion of 0.05 to 2.50 N/50 mm measured according to Finat FTM 10.
2. The single-sided self-adhesive film of claim 1, wherein the adhesion of the adhesion layer of the removable liner layer on the adhesion-friendly surface of the carrier film is at least twice as high as the adhesion of the layer of pressure sensitive adhesive of the self-adhesive film on the adhesion-reducing layer of the liner layer.
3. The single-sided self-adhesive film of claim 1, wherein the adhesion of the adhesion layer of the removable liner layer on the adhesion-friendly surface of the carrier film, measured according to Finat FTM 10, is a maximum of 50% of the adhesion of the layer of pressure sensitive adhesive of the self-adhesive film on a substrate where adhesion is to take place, measured by a method based on DIN EN 1939:2003, wherein the substrate is a floor, a stair, or a wall.
4. The single-sided self-adhesive film of claim 1, wherein the adhesion-friendly surface of the carrier film has a textile structure and/or is structured.
5. The single-sided self-adhesive film of claim 4, wherein the textile structure and/or the structuring of the adhesion-friendly surface of the carrier film, on a side facing the surrounding environment, has an adhesion-reducing surface, which makes up only the topmost, surrounding environment-facing surface of the textile structure and/or of the structuring of the carrier film, and further wherein the topmost, surrounding environment-facing surface of the textile structure and/or of the structuring of the adhesion-friendly surface of the carrier film accounts for not more than 20% of the normal surface of the textile structure and/or of the structuring.
6. The single-sided self-adhesive film of claim 1, further comprising a retarding layer for moisture and/or a blocking layer for plasticizers.
7. A method for producing the single-sided self-adhesive film of claim 1, the method comprising:
    applying a removable liner layer to the adhesion-friendly surface of the carrier film such that the layer of pressure sensitive adhesive has an adhesion on a surface of the removable liner layer that opposes the adhesion-friendly surface of the carrier film of less than or equal to 2.50 N/50 mm measured according to Finat FTM 10;
    applying the layer of pressure sensitive adhesive to a side of the carrier film that faces the surrounding environment and opposes the adhesion-friendly surface, and
    applying the removable liner layer to the adhesion-friendly surface of the carrier film, with the removable liner layer being applied before, during, or after the layer of pressure sensitive adhesive.
8. The method of claim 7, wherein a removable liner layer is applied on the adhesion-friendly surface of the carrier film, wherein an adhesion layer is applied to the removable liner layer before the application of the removable liner layer to the adhesion-friendly surface of the carrier film, wherein the removable liner layer is applied to the carrier film in such a way that the adhesion layer on the removable liner layer comes into contact with the adhesion-friendly surface of the carrier film, wherein the adhesion layer on the adhesion-friendly surface of the carrier film has an adhesion of 0.05 to 2.50 N/50 mm measured according to Finat FTM 10.
9. The method of claim 7, wherein the adhesion-friendly surface of the carrier film is produced by physical and/or chemical pretreatment, coating, embossing of the carrier film and/or joining of a textile structure to the carrier film.
10. A method for applying a single-sided self-adhesive film of claim 1 on a substrate, wherein the substrate is a floor, a stair, or a wall, comprising:
    applying the single-sided self-adhesive film of claim 1 to the substrate, rubbing and/or rolling the single-sided self-adhesive film on the substrate, optionally removing the removable liner layer of the single-sided self-adhesive film, and optionally applying an adhesive, a plastering and/or a leveling compound on the adhesion-friendly surface of the single-sided self-adhering self-adhesive film of claim 1.

11. The method of claim 10, wherein a leveling compound and/or an adhesive are/is applied on the adhesion-friendly surface of the single-sided self-adhering self-adhesive film, with a floor covering being bonded subsequent to the leveling compound and/or the adhesive.

* * * * *